United States Patent Office 2,704,245
Patented Mar. 15, 1955

2,704,245

PESTICIDAL TETRA-SUBSTITUTED UREAS

Norman E. Searle, Wilmington, Del., assignor to E. I. du Pont de Nemours and Company, Wilmington, Del., a corporation of Delaware No Drawing. Application October 13, 1953,
Serial No. 385,893

14 Claims. (Cl. 71—2.6)

This invention relates to tetra-substituted ureas and to herbicidal compositions and methods employing the compounds. More specifically, it relates to 1-(halophenyl)-1-alkyl-3,3-dimethylureas represented by the formula:

(1) 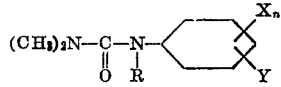

where R is alkyl up to two carbon atoms (i. e., methyl or ethyl); X is halogen; n is a positive integer up to three; and Y is selected from the group consisting of hydrogen and alkyl of 1 to 4 carbon atoms. The compounds are still further characterized in that the aromatic substituent (i. e., the substituent containing the benzene nucleus) has hydrogen on at least one of the nuclear carbons ortho to the nuclear carbon to which the urea nitrogen atom is linked. In other words, at least one of the ortho positions is unsubstituted.

X in Formula 1 above is preferably chlorine, R is methyl and Y is methyl. Preferably, there are no substituents on the nuclear carbon ortho to the nuclear carbon to which the urea nitrogen atom is linked. In those cases where Y is hydrogen, the most preferred compounds are those in which there is chlorine on the para position of the benzene nucleus.

This application is a continuation-in-part of my co-pending application Serial No. 273,767 filed February 27, 1952, and now abandoned.

The 1-(halophenyl)-1-alkyl-3,3-dimethylureas of the invention are suitably prepared, for example, by reaction of an N-methyl halophenyl carbamyl chloride with dimethylamine. The process is illustrated by the following equation but it will be understood that by suitable choice of the carbamyl chloride reactant, the other tetra-substituted ureas of the invention are similarly prepared.

(2) 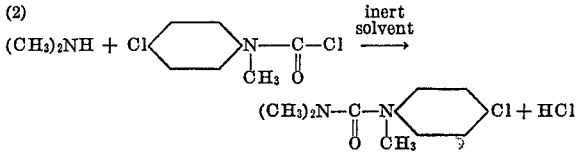

The carbamyl chloride-amine reaction is most readily carried out in the presence of an inert solvent such as dioxane, ethyl ether, or anisole. The reaction proceeds more rapidly at somewhat elevated temperatures, say, at the reflux temperature of the reaction medium. No catalyst is needed.

Alternatively, the compounds of the invention can be prepared by reaction of N-alkyl haloaniline with N,N-dimethyl carbamyl chloride, preferably in an inert solvent at elevated temperature.

The 1-(halophenyl)-1-alkyl-3,3-dimethylureas are in most cases high boiling, water-white or light yellow colored oily liquids. They can be distilled under high vacuum without substantial decomposition.

Illustrative of the compounds of the invention represented by Formula 1 above are:

1-(p-chlorophenyl)-1,3,3-trimethylurea
1-(2,4-dichlorophenyl)-1,3,3-trimethylurea
1-(2,4,5-trichlorophenyl)-1-ethyl-3,3-dimethylurea
1-(m-chlorophenyl)-1,3,3-trimethylurea
1-(p-iodophenyl)-1,3,3-trimethylurea
1-(3,4-dichlorophenyl)-1,3,3-trimethylurea
1-(2,4-dichlorophenyl)-1-ethyl-3,3-dimethylurea
1-(p-bromophenyl)-1,3,3-trimethylurea
1-(2,4,5-trichlorophenyl)-1,3,3-trimethylurea
1-(p-chlorophenyl)-1-ethyl-3,3-dimethylurea
1-(m-fluorophenyl)-1,3,3-trimethylurea
1-(o-chlorophenyl)-1,3,3-trimethylurea
1-(3,4-dichlorophenyl)-1-ethyl-3,3-dimethylurea
1-(2,5-dichlorophenyl)-1,3,3-trimethylurea
1-(2,4-dibromophenyl)-1,3,3-trimethylurea
1-(3-chloro-p-tolyl)-1,3,3-trimethylurea
1-(4-chloro-m-tolyl)-1,3,3-trimethylurea
1-(3-chloro-4-ethylphenyl)-1,3,3-trimethylurea
1-(3-chloro-4-isopropylphenyl)-1,3,3-trimethylurea
1-(3-chloro-4-sec butylphenyl)-1,3,3-trimethylurea
1-(3-bromo-p-tolyl)-1,3,3-trimethylurea
1-(2,5-dichloro-p-tolyl)-1,3,3-trimethylurea
1-(2,4-dichloro-5-methylphenyl)-1,3,3-trimethylurea The compounds of the invention are unusual because they exhibit varied pest control properties. Not only are they effective for the control of fungi but they also kill insects and mites and have valuable herbicidal properties.

In order to utilize the pest control properties of the 1-(halophenyl)-1-alkyl-3,3-dimethylureas of the invention to best advantage, the compounds are formulated by admixture with suitable pest control adjuvants to provide compositions in the form of solutions, dusts, water-dispersible powders, and aqueous dispersions or emulsions.

By the term "pest control adjuvant," I means a substance which is capable of presenting or aiding in the presentation of an active compound to the pest. The term "adjuvant" is well established in the art where it is recognized that an active agent or toxicant is in itself of little practical utility for combatting pests unless it be presented in the form suitable for effecting intimate contact of the agent or its vapors, as the particular case may require, with the pest, be the pest insects, fungi, mites, or weeds. Thus additional material or materials are employed in the formulation of an active agent to yield a suitable pest control composition, such materials being adjuvants. Such materials are also sometimes called conditioning agents since they are materials which are added to the active ingredient to assist in bringing it into a condition suitable for application.

Pest control adjuvants such as the dusts, solvents, wetting, dispersing, and emulsifying agents set out in U. S. Patent 2,426,417 can be employed in preparing the pest control compositions of the present invention. Other wetting, dispersing, and emulsifying agents such as those listed in detail in Bulletin E-607 of the Bureau of Entomology and Plant Quarantine of the U. S. Department of Agriculture and such as those set out in an article by McCutcheon in Chemical Industries, November 1947, page 811, entitled "Synthetic Detergents" may also be used.

Preferably the pest control compositions of the invention are in the form of "concentrates" suitable for dispersion in water to give aqueous spray compositions. A suitable emulsifiable oil concentrate is obtained, for example, by adding a dispersing or emulsifying agent to a 1-(halophenyl)-1-alkyl-3,3-dimethylurea of the invention, a solvent also being employed if desired. Preferably, the dispersing or emulsifying agent is one which is soluble in the compound, or the solvent, and ordinarily the agent will not comprise more than 10% by weight of the emulsifiable oil composition and with the better adjuvant materials, the percentage will be 5% or less.

Less concentrated emulsifiable oil concentrates are prepared by dissolving a tetra-substituted urea of the invention and a wetting, dispersing, or emulsifying agent in a solvent of the type conventionally used in the preparation of pest control compositions.

Dust compositions of the invention contain a 1-(halophenyl)-1-alkyl-3,3-dimethylurea of the invention adsorbed on finely divided carriers on dusts such as talc, pyrophyllite, natural clays, diatomaceous earths, and other powdered diluents such as those set out in the aforementioned U. S. patent.

The dust compositions of the invention are prepared by mixing intimately the tetra-substituted urea with the powdered carrier. Alternatively, the toxic compound can be dissolved in a volatile solvent such as acetone and the solution thus obtained then mixed with the powdered carrier and the solvent subsequently removed from the composition by evaporation.

Water-dispersible powders of the invention can be prepared by admixing one or more of the compounds of the invention with a surface-active dispersing agent and a finely divided solid carrier or dust such as those mentioned heretofore, the surface-active agent being used in amount sufficient to impart water dispersibility to the powder.

The content of the active compound or compounds of the invention in the pest control compositions of the invention will vary according to the manner in which and the purpose for which the composition is to be applied but, in general, will be from 0.5 to 95% by weight of the composition.

The active compounds of the invention are applied either as a spray or a dust to the locus or area to be protected from insects, fungi, and undesirable plant growth, or any one of these pests. The active compound is, of course, applied in amount sufficient to exert the desired pest control action. The application can be made directly upon the locus or area and the pest thereon during the period of infestation or, alternatively, the application can be made in advance of an anticipated infestation or otherwise applied so that the pest will come into contact with the toxic residue and be killed.

The compositions of the invention may include fungicides such as zinc dimethyl dithiocarbamate, zinc ethylene bis-dithiocarbamate, and manganese ethylene bis-dithiocarbamate; insecticides such as DDT, methoxychlor, chlordane; other fungicides and insecticides such as those set out in U. S. Patent 2,426,417; and may include fertilizers to form either powdery or granular compositions that can be used in the cultivation of agricultural crops.

In order that the invention may be better understood, the following examples are given in addition to the examples already given above.

*Example 1*

Dimethylamine (24 parts by weight) was added gradually to an agitated solution of 30 parts by weight of N-methyl-p-chlorophenyl carbamyl chloride in 100 parts by weight of anhydrous ether at room temperature. The resulting mixture was maintained at the reflux temperature for one hour, then cooled, and filtered. The ether filtrate was washed with water, dried, and distilled. The product 1-(p - chlorophenyl)-1,3,3-trimethylurea (19.7 parts by weight) was recovered as a water-white liquid by collecting the fractions boiling at 121–2° C./0.9 mm. Hg.

*Analysis.*—Calc'd for $C_{10}H_{13}ClN_2O$: Cl, 16.70. Found: Cl, 16.54.

*Example 2*

N-ethyl-p-chloroaniline (25 parts by weight) was added gradually beneath the surface of an agitated solution of 19.8 parts by weight of phosgene and 200 parts by weight of anisole at room temperature. The mixture was then heated at reflux temperature until HCl no longer evolved from the mass to give a clear solution of N-ethyl-p-chlorophenyl carbamyl chloride.

After cooling the above solution of the carbamyl chloride to 25° C., a total of 22 parts by weight of dimethylamine was added slowly as a liquid. The resulting mixture was then heated with stirring at reflux temperature for 30 minutes. The reaction mixture was then cooled to 25° C. washed with water, dried, and distilled. Product 1-(p-chlorophenyl)-1-ethyl-3,3-dimethylurea (27 parts by weight) was obtained as a water-white liquid by collecting the fractions boiling at 113–4° C./0.4 mm. Hg.

*Analysis.*—Calc'd for $C_{11}H_{15}ClN_2O$: Cl, 15.67. Found: Cl, 15.79.

*Example 3*

N-methyl-p-chloroaniline (17 parts by weight), 13.2 parts by weight triethylamine, and 25 parts by weight dioxane was added slowly over a two hour period to 16.1 parts by weight of N,N-dimethyl carbamyl chloride diluted with 15 parts by weight dioxane while maintaining the temperature at 30–60° C. After standing overnight at room temperature, the resulting mixture was heated at 77–85° C. for 2.5 hours, then cooled, and poured into water. The product 1-(p-chlorophenyl)-1,3,3-trimethylurea, a water-insoluble oil was extracted with ether and the ether extract then washed successively with 1 N HCl, 5% aqueous sodium bicarbonate, and water. After drying over sodium sulfate, the ether was evaporated and the residual oil distilled. There was obtained 11.1 parts by weight of the product 1-(p-chlorophenyl)-1,3,3-trimethylurea as a water-white liquid; B. P. 100.5–102.0/0.24 mm. Hg; $n_D^{25}$ 1.5572.

*Example 4*

A water-dispersible pest control powder is obtained by admixing 1-(p-chlorophenyl)-1,3,3-trimethylurea prepared as in Example 1 with finely divided fuller's earth and bentonite in the following proportions by weight:

35% 1-(p-chlorophenyl)-1,3,3-trimethylurea
5% bentonite
60% fuller's earth

The water-dispersible powdered composition of this example is free flowing and is easily dispersed in water to give a relatively stable suspension in an aqueous spray composition. A spray composition suitable for application for the control of such weeds as Johnson grass and quack grass is obtained by the dispersion of the composition of this example in water in the proportions of 0.25 pound of the composition per gallon of water.

*Example 5*

1-(p-chlorophenyl)-1-ethyl-1,1-dimethylurea prepared according to Example 2 is admixed with 5% by weight of a proprietary wetting, dispersing, and emulsifying agent having as its effective ingredient diethyl cyclohexylamine dodecyl sulfate.

The emulsifiable oil concentrate of this example is readily dispersible in water to obtain aqueous spray compositions which are effective in application for the control of mites and a variety of insects such as Southern army worms and aphids.

*Example 6*

A pest control dust is prepared by admixing 1-(3,4-dichlorophenyl)-1,3,3-trimethylurea with talc in the proportions of about 32 parts by weight of talc for each part by weight of the tetra-substituted urea.

The dust composition of this example is free flowing and is easily broadcast over an area to be protected from insects and weeds.

The following three examples illustrate emulsifiable oil compositions which are especially adapted for dispersing in water to give emulsions suitable for application to the area to be protected from the pests. The parts are by weight.

*Example 7*

25% 1-(3-chloro-p-tolyl)-1,3,3-trimethylurea
70% Alkylated naphthalene (solvent)
5% Alkyl aryl polyether alcohol (emulsifying agent)

*Example 8*

50% 1-(p-chlorophenyl)-1,3,3-trimethylurea
45% Alkylated naphthalene
5% Polyoxyalkylene sorbitol laurate (emulsifying agent)

*Example 9*

25% 1-(3,4-dichlorophenyl)-1,3,3-trimethylurea
70% Alkylated naphthalene
5% Alkyl aryl polyether alcohol

I claim:

1. A tetra-substituted urea represented by the formula

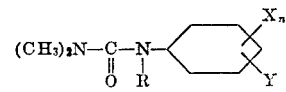

where R is an alkyl radical up to two carbon atoms, X is halogen, $n$ is a positive integer up to three, and Y is selected from the group consisting of hydrogen and alkyl of 1 to 4 carbon atoms, the aromatic substituent having hydrogen on at least one of the nuclear carbons ortho to the nuclear carbon to which the urea nitrogen atom is linked.

2. A pest control composition comprising a compound according to claim 1 in admixture with a pest control adjuvant.

3. A pest control composition comprising a compound according to claim 1 in admixture with a surface-active dispersing agent in amount sufficient to impart water dispersability to the composition.

4. A method for the control of fungi, insects, mites and undesirable plant growth which comprises applying to a locus to be protected, a tetra-substituted urea represented by the formula

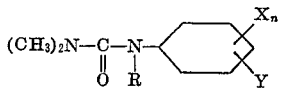

where R is an alkyl radical up to two carbon atoms, X is halogen, n is a positive integer up to three, and Y is selected from the group consisting of hydrogen and alkyl of 1 to 4 carbon atoms, the aromatic substituent having hydrogen on at least one of the nuclear carbons ortho to the nuclear carbon to which the urea nitrogen atom is linked.

5. A tetra-substituted urea represented by the formula

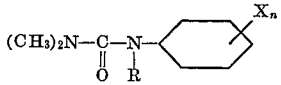

where R is an alkyl radical up to two carbon atoms, X is halogen, and n is a positive integer up to three, the aromatic substituent having hydrogen on at least one of the nuclear carbons ortho to the nuclear carbon to which the urea nitrogen atom is linked.

6. A pest control composition comprising a compound according to claim 5 in admixture with a pest control adjuvant.

7. A pest control composition comprising a compound according to claim 5 in admixture with a surface-active dispersing agent in amount sufficient to impart water dispersibility to the composition.

8. A method for the control of fungi, insects, mites and undesirable plant growth which comprises applying to a locus to be protected, a tetra-substituted urea represented by the formula

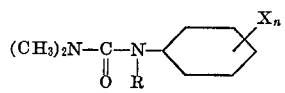

where R is an alkyl radical up to two carbon atoms, X is halogen, and n is a positive integer up to three, the aromatic substituent having hydrogen on at least one of the nuclear carbons ortho to the nuclear carbon to which the urea nitrogen atom is linked.

9. 1-(p-chlorophenyl)-1,3,3-trimethylurea.
10. 1-(3,4-dichlorophenyl)-1,3,3-trimethylurea.
11. 1-(3,4-dichlorophenyl)-1-ethyl-3,3-dimethylurea.
12. 1-(3-chloro-p-tolyl)-1,3,3-trimethylurea.
13. A pest control composition comprising 1-(3,4-dichlorophenyl)-1,3,3-trimethylurea in admixture with a surface active dispersing agent in amount sufficient to impart water dispersibility to the composition.
14. A method for the control of fungi, insects, mites, and undesirable plant growth which comprises applying 1-(3,4-dichlorophenyl)-1,3,3-trimethylurea to a locus to be protected from the pest.

References Cited in the file of this patent
UNITED STATES PATENTS

| | | |
|---|---|---|
| 2,336,464 | Buck et al. | Dec. 14, 1943 |
| 2,655,534 | Searle | Oct. 13, 1953 |

FOREIGN PATENTS

| | | |
|---|---|---|
| 38,492 | Australia | of 1950 |